United States Patent [19]
Midya et al.

[11] Patent Number: 5,801,519
[45] Date of Patent: Sep. 1, 1998

[54] SELF-EXCITED POWER MINIMIZER/ MAXIMIZER FOR SWITCHING POWER CONVERTERS AND SWITCHING MOTOR DRIVE APPLICATIONS

[75] Inventors: Pallab Midya, Schaumburg; Philip T. Krein, Champaign; Robert J. Turnbull, Urbana, all of Ill.

[73] Assignee: The Board of Trustees of the University of Illinois, Urbana, Ill.

[21] Appl. No.: 668,124

[22] Filed: Jun. 21, 1996

[51] Int. Cl.[6] .................................................. G05F 1/575
[52] U.S. Cl. ........................... 323/222; 323/906; 323/282
[58] Field of Search ................................ 323/906, 222, 323/283, 284, 285, 282; 363/37

[56] References Cited

U.S. PATENT DOCUMENTS

| | | | |
|---|---|---|---|
| 4,030,015 | 6/1977 | Herko et al. | 321/2 |
| 4,143,314 | 3/1979 | Gruber | 323/20 |
| 4,404,472 | 9/1983 | Steigerwald | 323/906 |
| 5,298,848 | 3/1994 | Ueda et al. | 318/811 |
| 5,604,430 | 2/1997 | Decker et al. | 323/906 |
| 5,644,219 | 7/1997 | Kurokawa | 323/906 |

OTHER PUBLICATIONS

Arcidiacono, Vittorio; Sandro Corsi, and Luciano Lambri; "Maximum Power Point Tracker for Photovoltaic Power Plants"; IEEE; Sep. 1982; pp. 507–512.

Umeda, Fumihiko; Masato Ohsato; Gunji Kimura and Mitsuo Shioya; "New Control Method of Resonant DC–DC Converter in small scaled Photovoltaic System"; IEEE; Jun. 1992; pp. 714–717.

Enslin, J.H.R. and D.B. Snyman; "Combined Low–Cost, High–Efficient Inverter, Peak Power Tracker and Regulator for PV Applications"; Jan. 1991; pp. 73–82.

Sullivan, Charles R. and Matthew J. Powers; "A High–Efficiency Maximum Power Point Tracker for Photovoltaic Arrays in a Solar–Powered Race Vehicle"; IEEE: Jun. 1993; pp. 574–580.

Hang, C.C. and Kok Kee Sin; "On–Line Auto Tuning of PID Controllers Based on the Cross–Correlation Technique"; IEEE; Dec. 1991; 428–436.

Famouri, Parviz and Jimmie J. Cathey; "Loss Minimization Control of an Induction Motor Drive"; IEEE; Jan./Feb. 1991; pp. 32–37.

*Primary Examiner*—Edward Tso
*Assistant Examiner*—Derek J. Jardieu
*Attorney, Agent, or Firm*—Woodard, Emhardt, Naughton Moriarty & McNett

[57] ABSTRACT

In any steady-state optimization problem, the output being optimized could be a nonmonotonic function of the controlled variable. Often the output is dependent on the temperature, the load impedance, and other unknown and variable quantities. Thus, it is very useful to have an automatic tuning scheme that will take the system to the desired operating point using only input and output information. The present invention is a generalized tuning scheme that uses the correlation between changes in the input and corresponding changes in the output to tune the operating point. In general terms, the present invention utilizes a correlation function between the controlled variable and a perturbed waveform. When the system reaches the desired operating point, the correlation goes to zero and the system converges. This corresponds to the point at which the derivative of the output with respect to the input is zero. This tuning scheme is appropriate for any tuning problem which has a single maximum or minimum. A variety of tuning problems in power electronics and other areas fall into this category. A tuning scheme based on correlation usually requires an excitation input. The switching action in the controlled circuit perturbs all the states and provides this excitation. Thus, this tuning scheme is appropriate for switching power applications. A preferred embodiment of the present application is used to control a power converter in a solar array application.

24 Claims, 16 Drawing Sheets

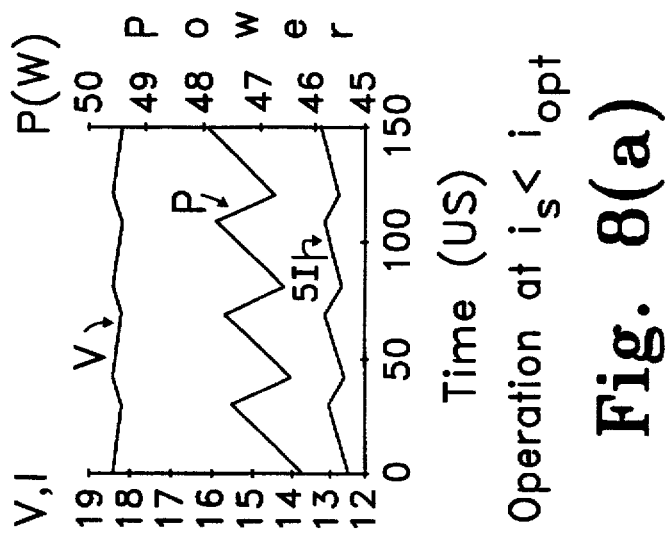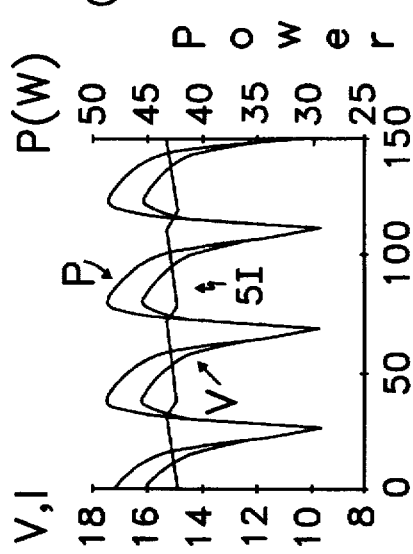
Fig. 8(a) Operation at $i_s < i_{opt}$
Fig. 8(b) Operation at $i_s \approx i_{opt}$
Fig. 8(c) Operation at $i_s > i_{opt}$

| $V_{out}$ | $I_{out}$ | $P_{out}$ | $I_{out(opt)}$ | $P_{out(opt)}$ | Tracking effectiveness, $P_{out}/P_{out(opt)}$ |
|---|---|---|---|---|---|
| 64.86 | 0.094 | 6.10 | 0.096 | 6.23 | 0.979 |
| 64.86 | 0.141 | 9.15 | 0.142 | 9.21 | 0.993 |
| 64.86 | 0.192 | 12.45 | 0.193 | 12.52 | 0.995 |
| 64.86 | 0.259 | 16.80 | 0.259 | 16.80 | 1.00 |
| 64.86 | 0.316 | 20.50 | 0.316 | 20.50 | 1.00 |
| 64.86 | 0.385 | 24.97 | 0.385 | 24.97 | 1.00 |
| 64.86 | 0.454 | 29.45 | 0.456 | 29.58 | 0.996 |
| 64.86 | 0.506 | 32.82 | 0.513 | 33.27 | 0.986 |

Fig. 10

SELF-EXCITED POWER MINIMIZER/ MAXIMIZER FOR SWITCHING POWER CONVERTERS AND SWITCHING MOTOR DRIVE APPLICATIONS

TECHNICAL FIELD OF THE INVENTION

The present invention generally relates to electronic control circuits and, more particularly, to an active power minimizer/maximizer for switching power converters and switching motor drive applications.

BACKGROUND OF THE INVENTION

The present invention is described herein, both in the background and the detailed description, primarily with reference to its application to switching power converters. However, this application is used only as an illustrative example, the concepts of the invention having wide applications in a variety of different fields, as reflected by the scope of the appended claims.

In the present application, upper-case quantities such as $P_s$ refer to average values in a converter, while lower-case values such as $v_s$ refer to the instantaneous time-varying signals. Ripple signals are important, and are indicated with a "r" subscript. The optimum points are denoted $v_{opt}$, etc.

Photovoltaic systems have found increasing applications since early demonstrations in the 1950's. These applications can be broken down into two broad categories: stand-alone applications and applications that augment the electric utility grid. Stand-alone applications have found the most widespread and diverse use to date. Specific examples are remote communication systems, remote water pumping systems for irrigation, remote weather sensing stations and remote lighting systems. These examples illustrate one of the more useful features of photovoltaics, namely, the ability to provide power in locations that are not directly connected to the electric utility grid. This feature has been taken to the extreme by the use of photovoltaic power systems in satellites and in mobile terrestrial applications such as electric vehicles.

The second category, systems connected to the electric utility grid, includes residential and commercial units that utilize photovoltaic arrays to supply a portion of their energy needs while relying on the normal utility grid to make up any excess load demands. Also included in this category are large-scale photovoltaic generation stations that can provide isolated communities with electrical power. Although these applications have not been developed as successfully as their stand-alone counterparts, the need remains for large-scale environmentally sound forms of energy.

Even though photovoltaics have the advantages discussed above, such as the ability to provide a source of clean renewable power, there are, however, a number of issues that must be addressed before applying photovoltaic technology. Consider the power-to-surface area relationship. The surface area of the array is directly proportional to the rated power output and thus to the cost of the array for a specific application. For stand-alone applications especially, cost effectiveness dictates that the system be of the minimal size to meet the load requirements. Also, in terms of non-terrestrial and mobile applications, reduced size equates to reduced weight and reduced energy consumption, either for self- or forced propulsion.

Surface area, however, is not the only characteristic factor that determines the power output of a photovoltaic array. The theoretical maximum efficiency of a silicon photovoltaic cell is 23%. This limitation is a result of the quantum interaction of the photons and electrons and is wavelength and material dependent. Typical peak efficiencies for terrestrial-grade single crystalline silicon photovoltaic cells are closer to 15%. On a standard day with 1000 W/m² incident solar radiation, a 1-m² array could produce at most 150 W, which assumes that the array is always operating at its "maximum power point," and thus its peak efficiency. Any prolonged deviations from this point will significantly reduce the overall array efficiency.

Consequently, efficiency is one of the most important technological issues with respect to photovoltaic systems, and the problem that arises is how to continuously operate the array near its maximum power point. The problem is severely complicated by the fact that the terminal characteristics of a photovoltaic array are highly nonlinear, temperature dependent and insolation dependent.

FIGS. 1 and 2 show the measured current versus voltage (IV) curve for a typical silicon photovoltaic array under various light and temperature conditions. FIG. 1 shows voltage-current behavior parameterized by illumination level. The short-circuit current is approximately a linear function of illumination intensity. The 100% level represents a standard intensity of 1 kW/m². FIG. 2 shows voltage-current behavior parametrized by temperature. Temperature alters the cell voltage at about $-0.4\%/°$ C. This reduces the array source voltage very significantly in operation: a good quality cell is about 15% efficient at converting light to electricity, so 85% of incident light heats the solar cell rather than contributing to electrical output. These curves are therefore the locus of operating points at the terminals of the array. The array has no inherent voltage or current regulation, and under sufficient illumination it will take on the terminal characteristics of any load to which it is attached. Theoretically the array's effective impedance can span from zero to infinity.

In order to do useful work with the photovoltaic array, power must be extracted from it. FIG. 3 depicts the power versus voltage (PV) curve for an array under specific operating conditions. It is clear from the figure that the array can have a wide range of power outputs under constant ambient conditions.

In FIG. 4, the area of the rectangle represents the instantaneous power provided by the array at a specific operating condition. There is only one "maximum power point" on the curve corresponding to the distinct voltage and current that produces the largest possible power area within the geometric constraints of the IV curve. In FIG. 4, the maximum power point corresponds to a dc resistance of approximately 40.3 Ω.

When the incident light intensity and/or temperature changes, the IV curve of the array also changes, as is graphically depicted in FIGS. 1 and 2. For any one IV curve, there is only one maximum power point. The locus of maximum power points for an array under variable ambient conditions is an unknown nonlinear function. Therefore, a simple linear impedance matching network placed between the array and the load will not do an optimal job of keeping the array near the maximum power point as ambient conditions change. In order for the array to operate near the maximum power point under a large range of conditions, a maximum power point tracker (MPPT) is required.

An MPPT is variable dc-dc converter that uses a control algorithm to force the terminals of a photovoltaic array to an impedance that produces the maximum power out of the array. It also serves as a dc transformer, ensuring that the load terminal requirements are met. As an example, the present discussion will assume that the photovoltaic array is used in a stand-alone capacity; hence the output of the MPPT is connected to a battery.

Batteries enable day/night continuous and inclement weather operations as well as providing an energy storage sink during peak power producing conditions when the load is fully satisfied. An additional benefit of the battery is the excellent voltage regulation it provides. As mentioned above, a photovoltaic array connected directly to a load will assume the same terminal characteristics as the load. FIG. 5 shows the charging characteristics of a typical lead-acid battery. Without an MPPT to condition the flow of power between the array and battery, the only time the array would operate at its maximum power point is when it corresponded exactly with the battery load line. Since the input impedance of the battery changes significantly based on its state of charge, a direct connection from the array to the battery would result in a less than optimal power transfer even at relatively constant ambient conditions for the array. Essentially, the MPPT is decoupling the load from the source in order to satisfy optimal conditions for both.

One specification parameter that measures MPPT success is the tracking effectiveness (TE). The tracking effectiveness is defined as the measured power produced by a photovoltaic array divided by the maximum possible power produced by the array.

$$TE \equiv \frac{P_{measured}}{P_{max}}$$

To achieve a high tracking effectiveness, the MPPT must keep the array operating near the maximum power point under steady-state conditions. Another relevant factor that can affect the tracking effectiveness is the response to transients occurring in the photovoltaic source. These transients can be due to variable cloud cover, shadows or thermal variations. Similarly, transients brought about by variations in the load demand can also occur without warning. The number and frequency with which these transients can occur necessitate that the circuit converge rapidly to the vicinity of the maximum power point to minimize lost power generation potential. The MPPT should maintain tracking over wide variations, such as illumination levels with 20 dB of dynamic range and wide temperature swings.

System conversion efficiency is another obvious design parameter. It is a function of the power electronic converter efficiency and is defined as the power out of the MPPT divided by the power into the MPPT.

$$\eta_c \equiv \frac{(P_{out})}{P_{in}}$$

In order to preserve investments in both the MPPT electronics and the load, the MPPT should be equipped with sufficient protective features. Furthermore, a rugged, reliable design will greatly enhance the long-term utility of the MPPT. In summary, it is desirable to have an MPPT that exhibits the following characteristics:

high conversion efficiency (>95%), high tracking effectiveness (>90%), rapid convergence in response to line and load transients (<100 ms) and reliable design.

The issue of power tracking has been addressed in the prior art with perturbation techniques: an interface converter adjusts the source voltage $V_s$ or current $I_s$ and monitors the power $P_s$. A microprocessor or similar hardware compares various operating points and selects for maximum power. The perturbation process operates continuously to keep the power near its maximum. The process in effect serves as a way to measure a derivative such as $\partial P_s/\partial V_s$, then operate the interface converter such that $\partial P_s/\partial V_s \cong 0$. It is hard to implement the process without an active control and memory because of the sign of $\partial P_s/\partial V_s$: above the optimum voltage, $\partial P_s/\partial V_s < 0$, while below the optimum $\partial P_s/\partial V_s > 0$. Information from off-optimum operating points is necessary to determine the derivative sign. It is clear from FIGS. 3 and 4 that if the sign of $\partial P/\partial t$ is positive and the sign of $\partial V/\partial t$ is positive, then the array is operating on the left-hand side of the maximum power point, and the voltage must continue to be increased. Once the sign of $\partial P/\partial t$ turns negative, then the power is decreasing, and the array is operating on the right-hand side of the maximum power point. The voltage, in turn, must be decreased, which results in the sign of $\partial V/\partial t$ being negative, but the sign of $\partial P/\partial t$ is again positive. This procedure is continued as the array oscillates around the maximum power point.

In most implementations, the perturbation method uses average voltage, power, or current, and perturbs the converter duty ratio to provide information about the derivatives. The process is relatively slow, since good signal to noise ratio requires averages over many cycles. Systems reported in the prior art follow the maximum power point at time scales of seconds or longer.

The current best practice in solar power control is represented by C. R. Sullivan and M. J. Powers, "A high-efficiency maximum power point tracker for photovoltaic arrays in a solar-powered race vehicle," in *IEEE Power Electronics Specialists Conference Record*, 1993, pp. 574–580. The circuit described there perturbs the operation of a switching converter slowly to evaluate and adjust the change of power with respect to voltage. This prior art method must explicitly move the converter away from the optimum point in order to sense the change of input power. This control method therefore needs to sacrifice energy in order to locate the maximum power point. This, of course, works against the goal of increasing converter efficiency.

SUMMARY OF THE INVENTION

In any steady-state optimization problem, the output being optimized could be a nonmonotonic function of the controlled variable. Often the output is dependent on the temperature, the load impedance, and other unknown and variable quantities. Thus, it is very useful to have an automatic tuning scheme that will take the system to the desired operating point using only input and output information. The present invention is a generalized tuning scheme that uses the correlation between changes in the input and corresponding changes in the output to tune the operating point. In general terms, the present invention utilizes a correlation function between the controlled variable and a perturbed waveform or waveforms. When the system reaches the desired operating point, the correlation goes to zero and the system converges. This corresponds to the point at which the derivative of the output with respect to the input is zero. This tuning scheme is appropriate for any tuning problem which has a single maximum or minimum. A variety of tuning problems in power electronics and other areas fall into this category. A tuning scheme based on correlation usually requires an excitation input. The switching action in the controlled circuit perturbs all the states and provides this excitation. In the present invention, the perturbations resulting from the switching action of the circuit are used in constructing the correlation function. Thus, this tuning scheme is appropriate for switching power applications. A preferred embodiment of the present application is used to control a power converter in a solar array application.

In one form of the invention a method for controlling a parameter of an electrical circuit is disclosed, comprising the steps of: (a) sensing a waveform in the circuit that is perturbed by operation of the circuit; (b) computing a correlation between the perturbed waveform and the parameter to be controlled; and (c) changing an operating point of the circuit until the correlation is minimized.

BRIEF DESCRIPTION OF THE DRAWINGS

FIGS. 8a–c are graphs of voltage, current and power vs. time for a power conversion circuit using a solar array as an input source for various levels of source current.

FIG. 10 is a table of the tracking effectiveness of the circuit of FIG. 9 for various parameters.

DETAILED DESCRIPTION OF THE PREFERRED EMBODIMENT

Figure 1:
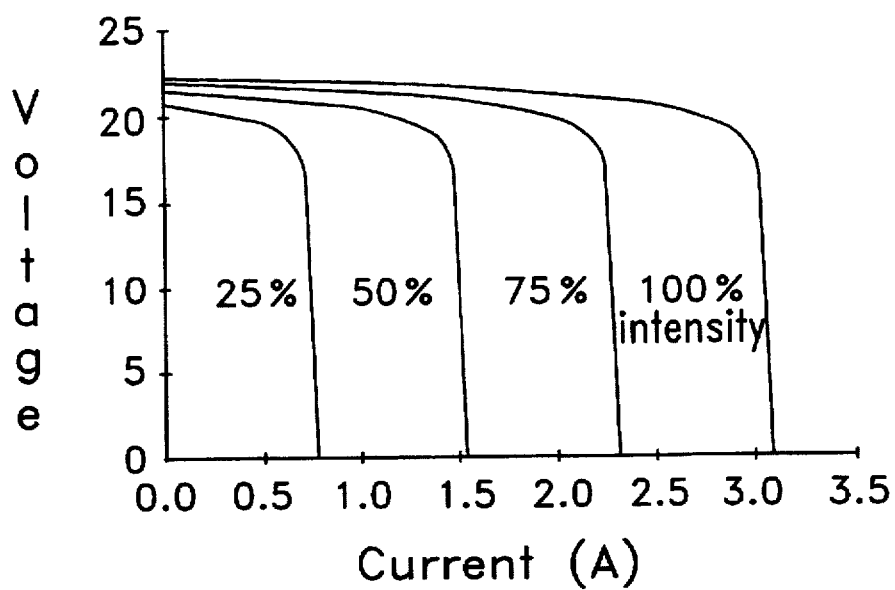
FIG. 1 is a graph of voltage vs. current in a solar cell array, showing variation with solar intensity.
Figure 2:
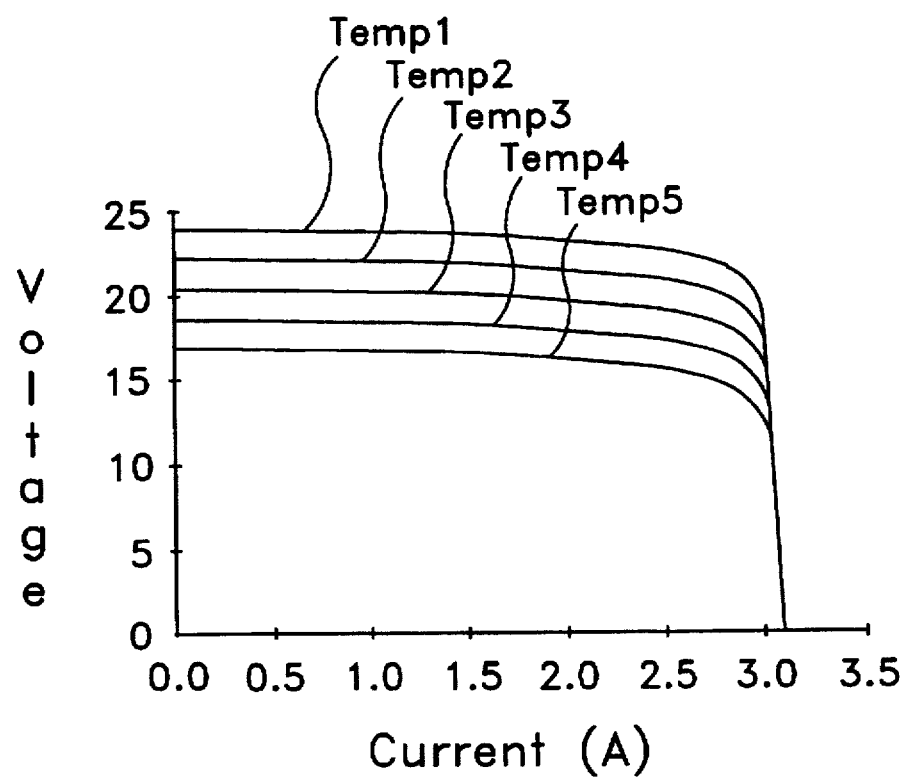
FIG. 2 is a graph of voltage vs. current for a solar array, showing variation with temperature.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Switching Ripple as an Alternative Perturbation

The prior art perturbation process is inconvenient, slow, and fundamentally sub-optimal in the sense that the converter must be perturbed from the desired point for control purposes. However, an MPPT is normally a switching power converter that exposes the source to low-level ripple. The ripple can be considered a dynamic perturbation. The present invention makes use of the ripple itself to obtain maximum power tracking in a photovoltaic application. No extra perturbation is needed, so the technique keeps converter operation at the optimum point. Ripple measurement allows tracking on a time scale of only a few switching periods. The approach computes a dynamic measure of $\partial p_s/\partial i_s$ or $\partial p_s/\partial v_s$ from voltage and current. The information is used in a pulse width modulation (PWM) feedback loop in a conventional dc-dc converter. A preferred embodiment uses a simple analog control circuit, and tracks the maximum power of a solar panel over a bandwidth approaching 1 kHz.

Figure 6:
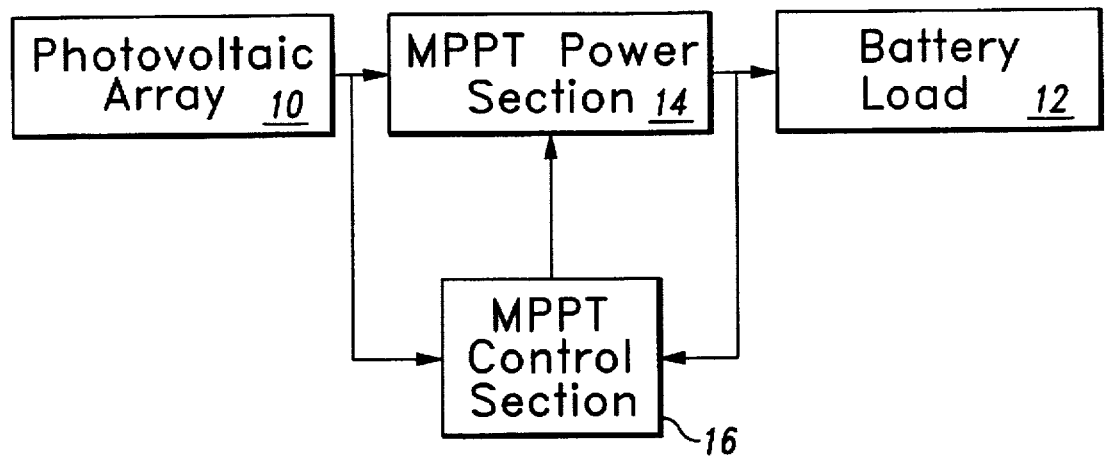
FIG. 6 is a schematic block diagram of a solar cell array coupled to a battery load by a power converter.

FIG. 6 illustrates a block diagram of an entire photovoltaic system which incorporates an application of the present invention. The system includes a photovoltaic array 10, such as an array of solar cells, which are a source of power. It is desired to transfer this power from the photovoltaic array 10 to the battery load 12 in order to charge the battery 12. The MPPT is coupled between the photovoltaic array 10 and the battery load 12 in order to maximize the power transfer efficiency from the photovoltaic array 10 to the battery load 12. The MPPT includes a power section 14 which actually accomplishes the power transfer, and a control section 16 which continuously adjusts the power section 14 in order to optimize the power point at which the circuitry operates.

Figure 7:
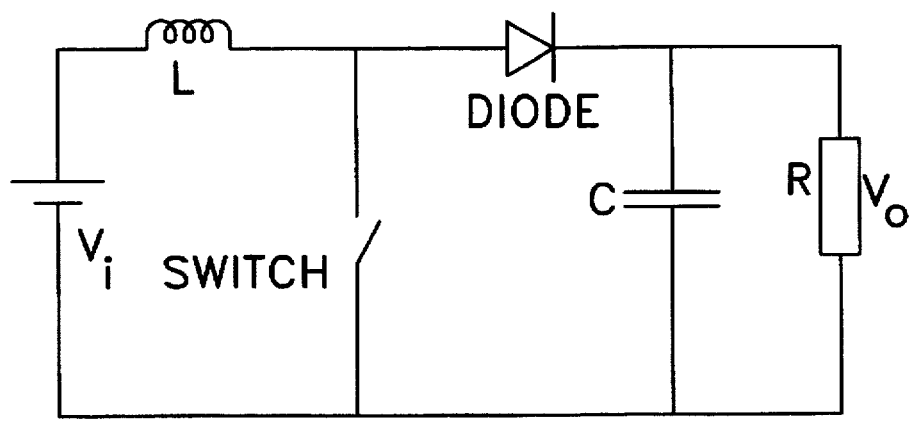
FIG. 7 is an electrical schematic diagram of a typical boost converter circuit.

Physically, the power section 14 is a power converter, which is a network of switches and passive storage elements (inductors, capacitors and transformers). The passive elements store energy in order to smooth the power transfer without loss. FIG. 7 schematically illustrates a typical boost converter, which is an example of a switching power converter for interfacing a dc source to a dc load. When the switch is turned on, the inductor stores energy from the source. When the switch is turned off, this energy is fed to the load and the output capacitor through the diode. The energy stored in the capacitor provides the load power when the switch is turned on. The output voltage obtained is higher than the input voltage by a factor of $1/(1-D)$, where D is the duty ratio of the switch.

Ripple Correlation as the Control Signal

Figure 4:
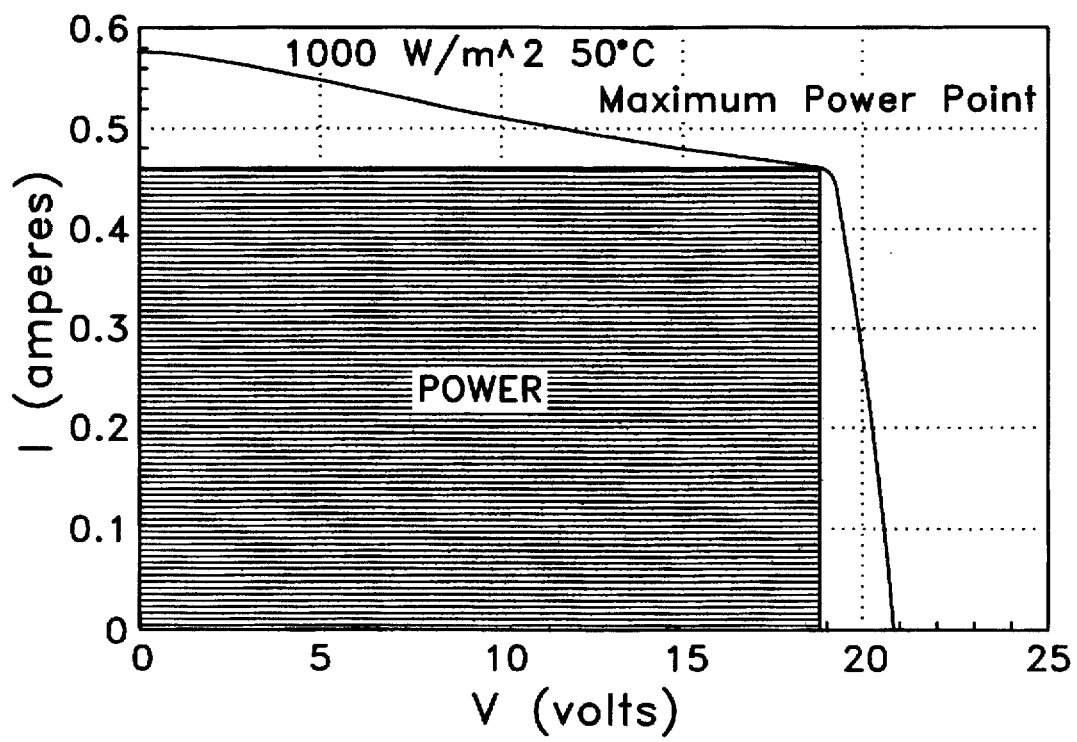
FIG. 4 is a graph of current vs. voltage for a solar array, illustrating the location of the maximum power point.
Figure 5:
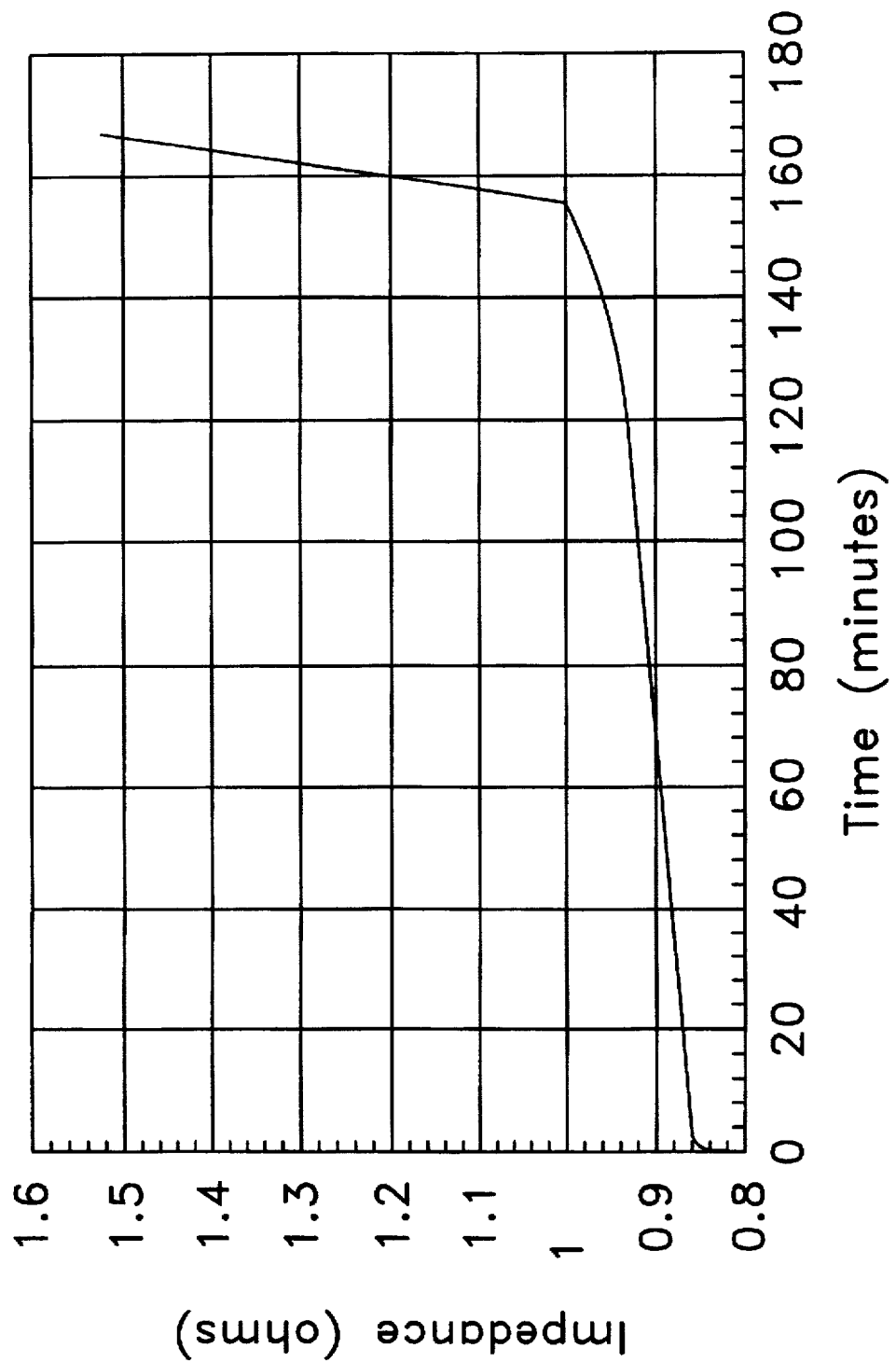
FIG. 5 is a graph of impedance vs. time for a battery being charged from an external power source.

Continuous operation of the switch exposes the photovoltaic array to current and voltage ripple. If the characteristic curve in FIG. 4 is taken as a dynamic V-I model, the ripple will cause the input to move back and forth along the characteristic. In FIG. 8, the instantaneous behavior of $v_s$, $i_s$, and $p_s$ is illustrated for three cases: current below that for the optimum power, $i_s < i_{opt}$, current near the optimum, and current above the optimum (note that the current is plotted at five times actual value). This behavior would be similar for any dc-dc converter topology.

The array behavior is reflected in both the shapes and phase relationships. In particular, notice that the phase relationships between $p_s$ and either $v_s$ or $i_s$ change through the optimum point. Correlation is one convenient way to obtain relative phase information. The maximum power point can be tracked by following the correlation between $p_s$ and either the voltage or current ripple waveform. A heterodyne process can be used or a more formal correlation can be computed. Let us denote the time derivative with a prime symbol ('). The products $p_s' v_s'$ or $-p_s' i_s'$ give the necessary phase information: on the average, $p_s' v_s'$ or $-p_s' i_s'$ will be negative if $i_s < i_{opt}$, positive if $i_s > i_{opt}$, and zero when the maximum power point is being tracked. We use the product $p_s' v_s'$ as the basis of control, because the current is so close to constant above the optimum value that the current ripple becomes very small just beyond the desired operating point. It is important to observe that the product $p_s' v_s'$ is a chain rule derivative, equal to $(dp_s/dv_s)(v_s')^2$. Thus the ripple product can be considered a measure of $\partial P_s/\partial V_s$. If the product is driven to zero, power will be maximized.

An actual implementation does not require measurement of power. By the chain rule, $$p_s' v_s' = (i_s v_s' + v_s i_s') v_s' \qquad (1)$$

For control flexibility, a gain parameter $\alpha$ is added, to give $$p_s' v_s' = (\alpha i_s v_s' + v_s i_s') v_s' \qquad (2)$$

The time integral of (2) represents a correlation function $c_p(t)$. This function can be used directly as a duty ratio control input for the converter. The integral control approach will drive (2) to zero, and therefore tracks $p_{opt}$ continuously and quickly.

Figure 3:
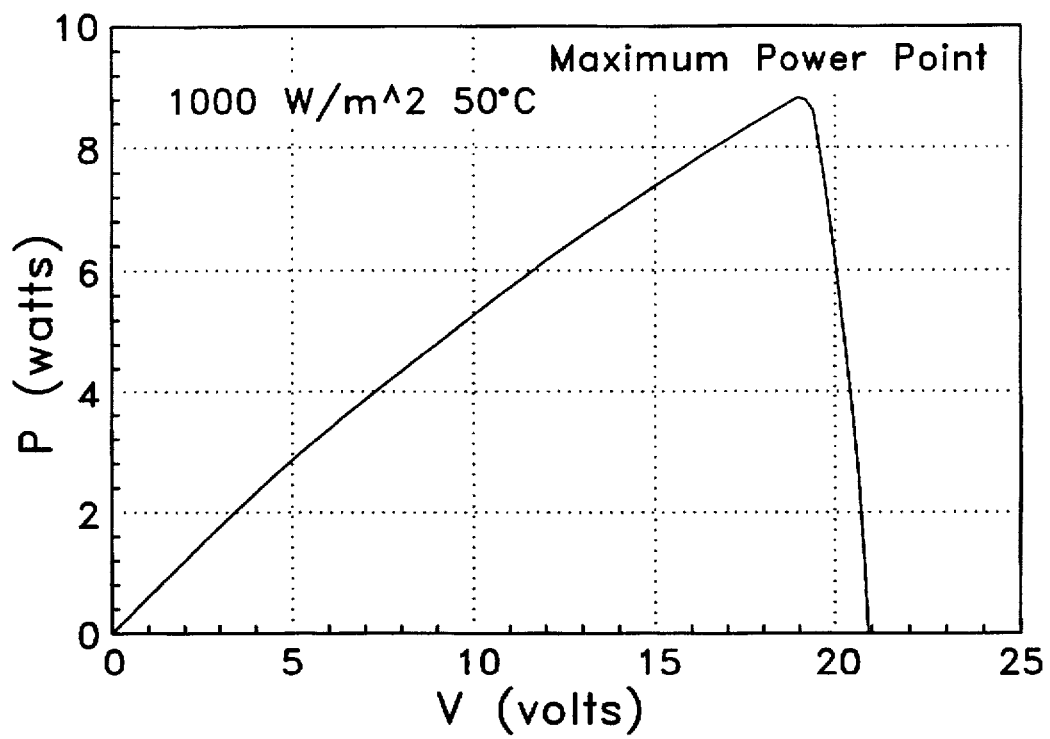
FIG. 3 is a graph of power vs. voltage for a solar array.

The waveforms in FIG. 3 suggest an alternative control formulation. If ac-coupled measurements of $i_s$ and $v_s$ are made, written as $i_{rs}$ and $v_{rs}$, then the phase information is contained in $p_{rs} v_{rs}$. The ac portion of the power is the product $(V_s+v_{rs})(I_s+i_{rs})$ less the dc portion $V_s I_s$. This product can be written as $$p_{rs} v_{rs} = (V_s i_{rs} + I_s v_{rs}) v_{rs} \qquad (3)$$

This is just like (1), except that ac coupled signals have been substituted for time derivatives. The time integral of (3) can serve as a control signal. This simple method tracks the maximum power point continuously, just as $c_p$ does.

Stability Analysis

The correlation control $c_p$ provides a monotonic function that has a constant value if the converter operates at the maximum power point. The duty ratio control input $d(t)$ is given by $d(t) = -k c_p(t)$. It is important to consider the conditions required to ensure successful operation. Global stability can be proved with few restrictions.

The control law (with $\alpha=1$) can be written as $$d(t) = -k \int \frac{dp_s}{dt} \frac{dv_s}{dt} dt \qquad (4)$$

The time derivative of power based on the chain rule can be written $$\frac{dp_s}{dt} = \frac{\partial p_s}{\partial v_s} \frac{dv_s}{dt} \qquad (5)$$

Substitution into (4) yields $$d(t) = -k \int (v_s')^2 \frac{\partial p_s}{\partial v_s} dt, \text{ or } d' = -k (v_s')^2 \frac{\partial p_s}{\partial v_s} \qquad (6)$$

Stability relies on two basic assumptions: first, that there are no local maxima in $P_s$ (or $p_s$) with respect to $v_s$; second, that there is always nonzero ripple in input voltage. The first assumption means that anywhere away from the absolute maximum power, $\partial p_s/\partial v_s$ is strictly nonzero. If this condition fails, then the duty ratio stops changing, latching on to a local maximum. In the solar cell system, experimental data shows no evidence of local maxima; if any were present in known locations, some method of restriction would be necessary to exclude these maxima from the operating region. The second assumption is, in general, true whenever the converter is switching. Since the voltage is always changing when the switches are active, $(v_s')^2$ is always strictly positive. The system will always be perturbed. In the implementation here, this second assumption is enforced by limiting the duty ratio, so that it can never be 0 or 100%.

Under these two assumptions, (6) has an equilibrium point: $d'=0$ if and only if $\partial p_s/\partial v_s=0$. It remains to show that this equilibrium point is stable. Disturbances to the system can be analyzed as if starting from some duty ratio $d_{opt}$ corresponding to the optimum point $v_{opt}$, $i_{opt}$, and $P_{opt}$. The question of stability reduces to whether or not $p_s(t)$ approaches $p_{opt}$ over time. As an example converter with nonlinear behavior, consider a boost converter. This circuit is shown in FIG. 7. Ideally, the input and output voltage are related by the switch duty radio, such that $V_s=V_{opt}(1-D)$. Let the switch have some on-resistance $R_{ds(on)}$. The diode exhibits a forward drop $V_d$, and resistance. For simplicity, let the diode resistance be $R_{ds(on)}$ as well. The input-output relationship becomes $$V_s = R_{ds(on)} I_s + (1-D)(V_{out}+V_d) \qquad (7)$$

The time derivative of (7) can be simplified to $$V_s' = -\frac{d'(V_{out}+V_d)}{1 - R_{ds(on)} \frac{\partial i_s}{\partial v_s}} \qquad (8)$$

As long as $\partial i_s/\partial v_s$ is always negative, as in solar cells, the derivative $V_s'$ is negative with respect to $d'$. This fact is used to advantage in the Lyapunov stability analysis that follows.

Consider a cost function $J=P_{opt}-P_s$. Since $P_{opt}$ is the maximum power, the function $J(t) \leq 0$. By the direct method of Lyapunov, if the time derivative $dJ/dt=-dP_s/dt$ is negative, the equilibrium point is stable. Disturbances to the system can be separated into two classes: changes to the load voltage and changes to the operating point $P_{opt}$. Starting from equilibrium, a step change in $V_{out}$ will not change d initially. However from (7) the value of $V_s$ will make a step change owing to the change in $V_{out}$. Since a step change in $V_s$ moves operation off the equilibrium point, at some time $\delta t$ after a step change, $\partial P_s/\partial V_s$ and $d'$ are no longer zero. For a step increase in $V_{out}$, such as a power-on transient, there is a step increase in $V_s$. For $v_s > v_{opt}$, the derivative signs become $$\frac{\partial P_s}{\partial V_s} < 0, d' > 0 \qquad (9)$$

From (8), this causes $V_s$ to fall. The power therefore rises, and $dJ/dt<0$. For a step decrease in $V_{out}$, there is an initial decrease in $V_s$. The solar cells exhibit a positive value for $d'$. From (8), the voltage $V_s$ rises. The power therefore rises, and dJ/dt <0. Any step change in $V_{out}$ is followed by some transient in which J is caused to decrease, guaranteeing large-signal stability for this type of disturbance.

In some sense, a step change to the source is equivalent to a step change in the load. Change in illumination, for example, moves the maximum power point from $V_{opt}$ and $P_{opt}$ to new values $V_{opt(2)}$, $P_{opt(2)}$. If the change in the source is fast relative to the time constant of the integrator for $c_p$, then $V_s$ does not change instantaneously. At this point, either $V_s > V_{opt(2)}$ (equivalent to a step increase in $V_{out}$), or $V_s < V_{opt}$, and the situation is equivalent to a step decrease in $V_{out}$. In either case, the algorithm forces J to decrease with time, and large-signal stability is guaranteed.

The Preferred Embodiment MPPT Circuit

Figure 9:
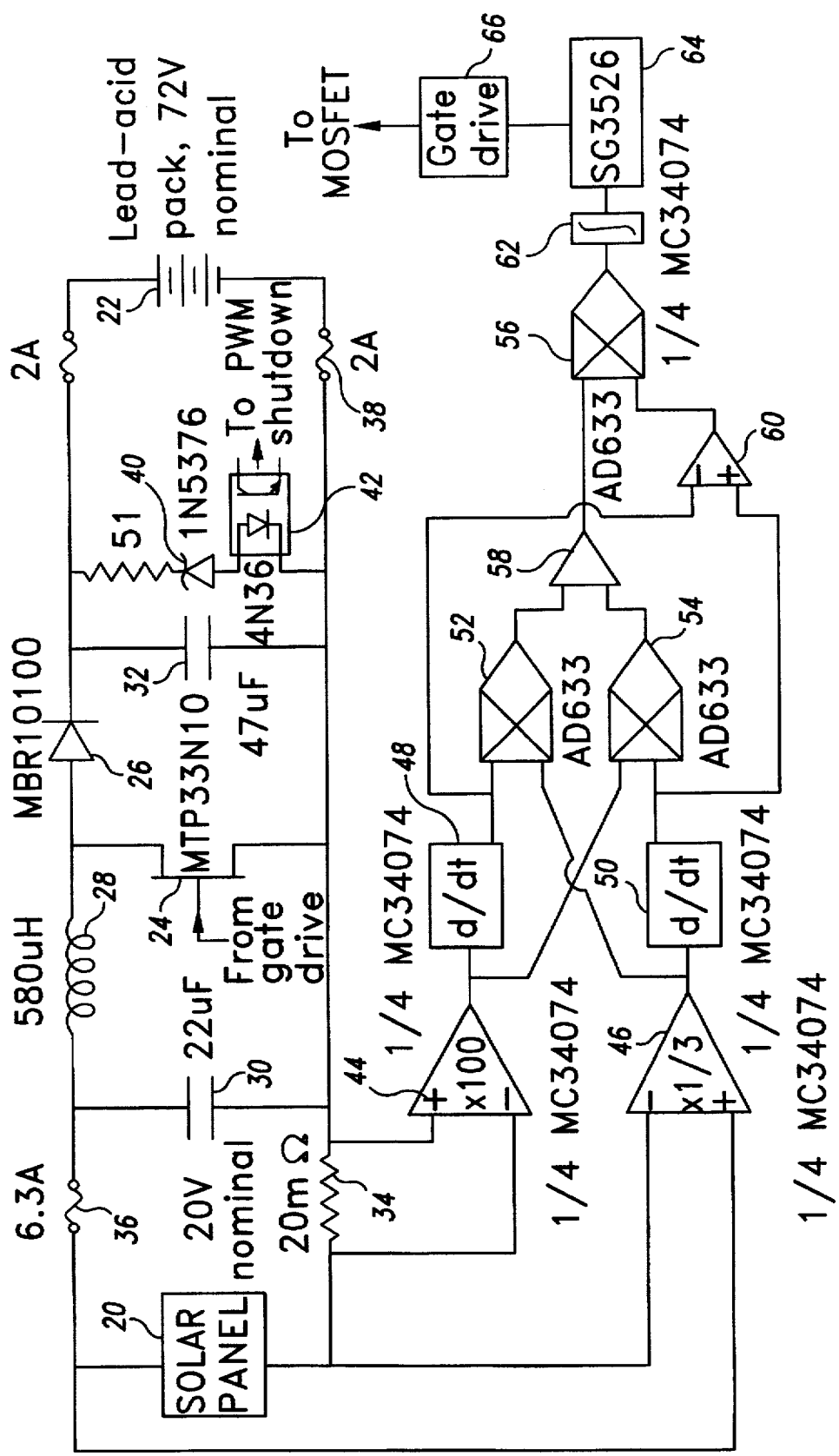
FIG. 9 is an electrical schematic diagram of a preferred embodiment power converter and control circuit of the present invention.

The correlation control technique has little dependence on the form of the power converter. It can be used with any duty-ratio controlled dc-dc converter, or adapted for frequency adjustment in resonant converters. The preferred embodiment boost converter and controller shown in FIG. 9 has been used in the solar vehicle application with excellent results. The photovoltaic solar panel array 20 is coupled for optimum power transfer to the load battery 22. The solar panel 20 has a nominal output voltage of 20V. The load battery 22 may be, for example, a lead-acid battery pack, having a nominal terminal voltage of 72V. The solar panel 20 is coupled to the battery 22 via a boost converter circuit. The boost converter circuit of FIG. 9 is based upon the general boost converter model of FIG. 7. A metal oxide silicon field effect transistor (MOSFET) 24 is used as the controlled switch due to its ease of control, high efficiency and fast switching time. The diode 26 is an ultra-low loss Schottky diode. The inductor 28 is a low-loss gapped ferrite core wound with 18-gauge magnet wire. The input capacitor 30 serves to smooth out the input voltage ripple and to keep the perturbations around the maximum power point to an acceptable minimum value, while the output capacitor 32 acts as a filter for the output voltage waveform. The 20 milliohm current sense resistor at the negative terminal of the input is used to generate the feed-forward proportional current signal for the control section. One input fuse 36 and two output fuses 38 protect the circuit from current spikes or shorts to the battery pack 22. The zener diode 40 and optocoupler diode 42 serve as an emergency shut off mechanism, as described in greater detail hereinbelow.

The remainder of the circuitry in FIG. 9 implements the control section of the MPPT. This control section implements the correlation function.

$$c_p(t) = \frac{1}{T} \int_0^t ((\alpha i_s v_s' + v_s i_s') v_s') dt \quad (10)$$

The circuit uses four high slew rate, low input offset voltage bipolar operational amplifiers 44, 46, 48 and 50 in a differential amplifier mode. The amplifier 44 amplifies the current sense voltage by a factor of 100, while the amplifier 46 attenuates the input voltage signal by a factor of 3. The amplifier 48 differentiates the output from the amplifier 44 in order to provide the dI/dt signal. Similarly, the amplifier 50 differentiates the output of the amplifier 46 in order to provide the dV/dt signal.

The multiplication and summation functions required by the control correlation algorithm are handled by three separate four-quadrant analog multipliers 52, 54 and 56 with differential high impedence inputs. The differential amplifiers 58 and 60 are used to combine various input signals prior to multiplication by the multiplier 56.

The output from the multiplier 56 is integrated by an integrator 62 comprising a bipolar operational amplifier in the standard integrator configuration. The integrator time constant is preferably approximately 0.2 milliseconds, which is on the order of three times slower than the switching frequency.

Pulse width modulation (PWM) is a form of control wherein the duty ratio of a controlled switch (in this case the MOSFET 24) is adjusted to regulate the flow of power through the converter. In the circuit of FIG. 9, PWM is achieved using the regulating pulse width modulation chip 64. One desirable feature of the PWM chip 64 is that it contains a SHUTDOWN pin that can be utilized in the overvoltage and open circuit protection subcircuit, as described in greater detail hereinbelow. The square wave output signal from the PWM chip 64 is amplified by the gate drive 66 in order to provide an acceptable gate-to-source voltage signal to control the MOSFET switch 24. The gate drive 66 utilizes a logic gate optocoupler and a discrete bipolar junction transistor push-pull amplifier.

The SHUTDOWN feature of the PWM chip 64 is exploited in the circuitry of FIG. 9 in order to disable the boost converter when the output voltage exceeds a nominal value of 90V, which could happen under two separate circumstances: an open-circuited output or a fully charged battery back 22. In either case, when the voltage across the reverse-biased zener diode 40 is exceeded, some reverse current will flow through the diode 40, which will forward-bias the optocoupler 42 diode and pull the SHUTDOWN pin on the PWM chip 64 low. In steady state, enough current will flow in this circuit to maintain the reverse-bias on the zener diode 40 until the offending condition is alleviated.

FIG. 10 lists tracking effectiveness results for the circuit of FIG. 9, given a fixed output voltage and varying levels of illumination. The value of $P_{opt}$ is determined by manual adjustment. Tracking effectiveness is limited only by controller precision, and FIG. 10 shows that the preferred embodiment control circuit does indeed drive the converter to the maximum power point. Additional experiments on tracking effectiveness gave values of 98% or better for illumination levels between 10% and 100% and over cell temperatures ranging from 10° C. to more than 70° C.

Power efficiency is a function of the converter design rather than the control algorithm, since only a few low-power analog ICs are needed in the implementation. Typical conversion efficiency was about 96% for this circuit, including all control power.

Dynamic Performance (Transient Operation)

Regarding transient operation, the quality one looks for is speed. How fast can the circuit respond to changes in the source and in the load? The first phenomenon addressed is the occurrence of source transients. The characteristics of photovoltaic cells were presented hereinabove, where it was shown that for a specific array, the power output will be a function of the illumination, temperature and the illuminated area. In a photovoltaic system, source transients can be frequent and abrupt depending on the application. This is the case for terrestrial mobile applications especially. Transients can be caused by the wind or by propulsion-induced convective cooling. Transients also can be caused by clouds or by shading from trees, buildings or anything else that obstructs the sun. If the response time to these transients is slow, and there are a significant number of transients in a given time period, then the energy lost during these transients can significantly erode the effectiveness of the circuit.

Figure 11A:
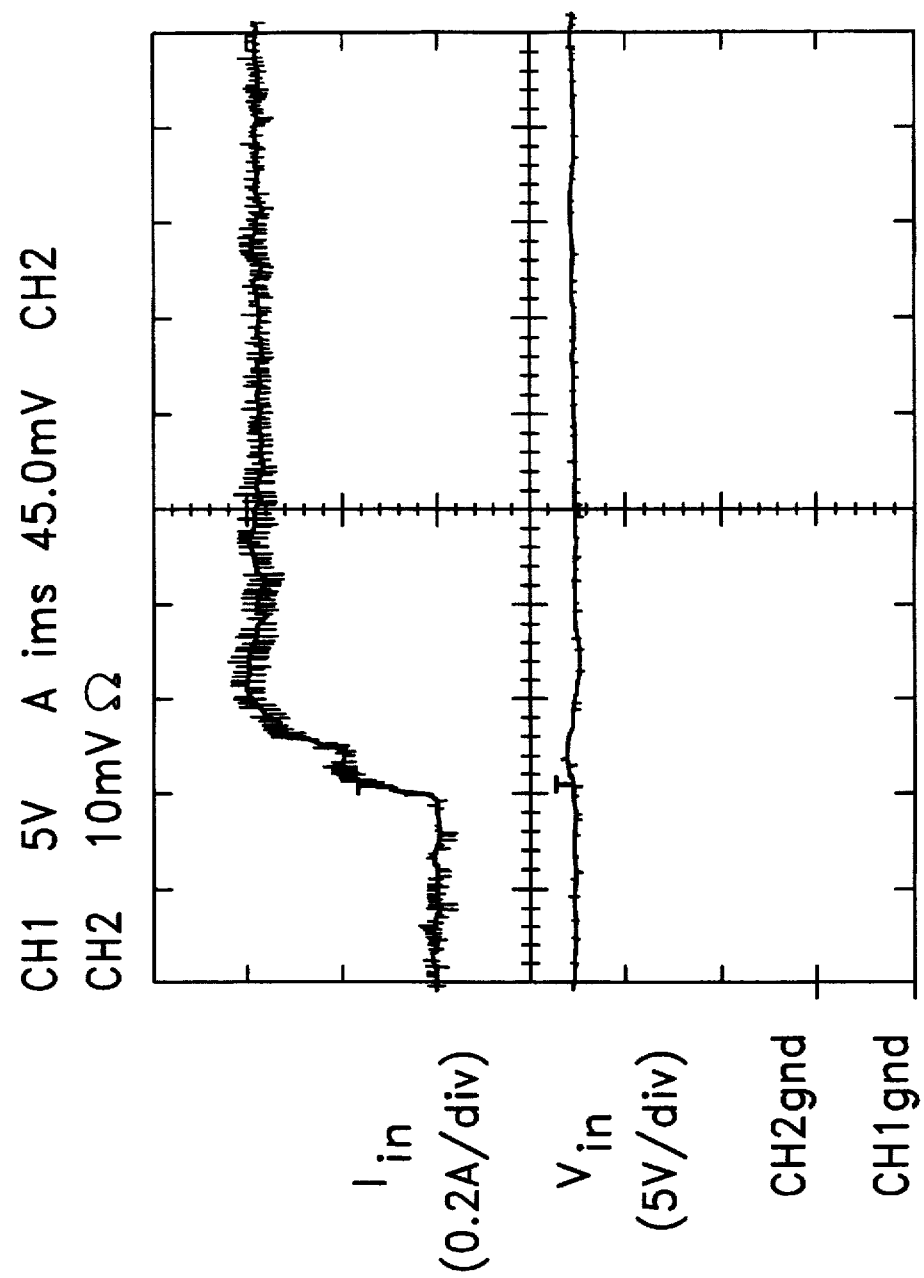
FIGS. 11a–b illustrate the transient response of the circuit of FIG. 9 for step changes in the input power.
Figure 11B:
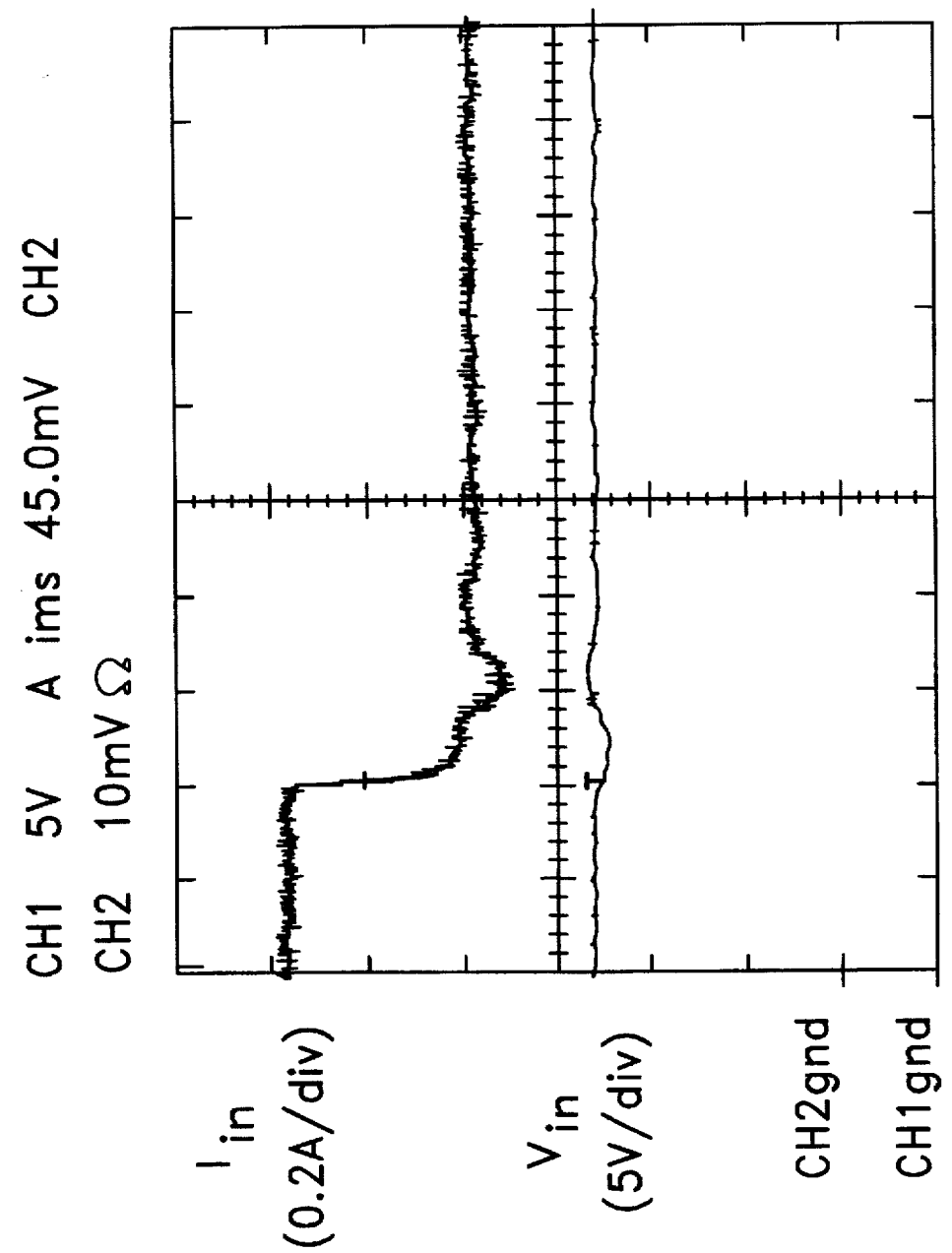

FIG. 11 shows the circuit's response to source transients. The source transients consisted of near instantaneous changes of input power of approximately 33% both up and down. The input current and input voltage is depicted versus time to illustrate the speed. For all transient response data presented herein, the input current measurement, $I_{in}$, is shown on channel 2. In FIG. 11, the response to an input step is recorded. In FIG. 11a, an additional solar panel is switched in to step the maximum power point by 33%. The converter recovers to the optimum level in about 2 ms. FIG. 11b shows the response to an input power decrease. Again, the converter returns to the optimum point within about 2 ms.

Figure 12A:
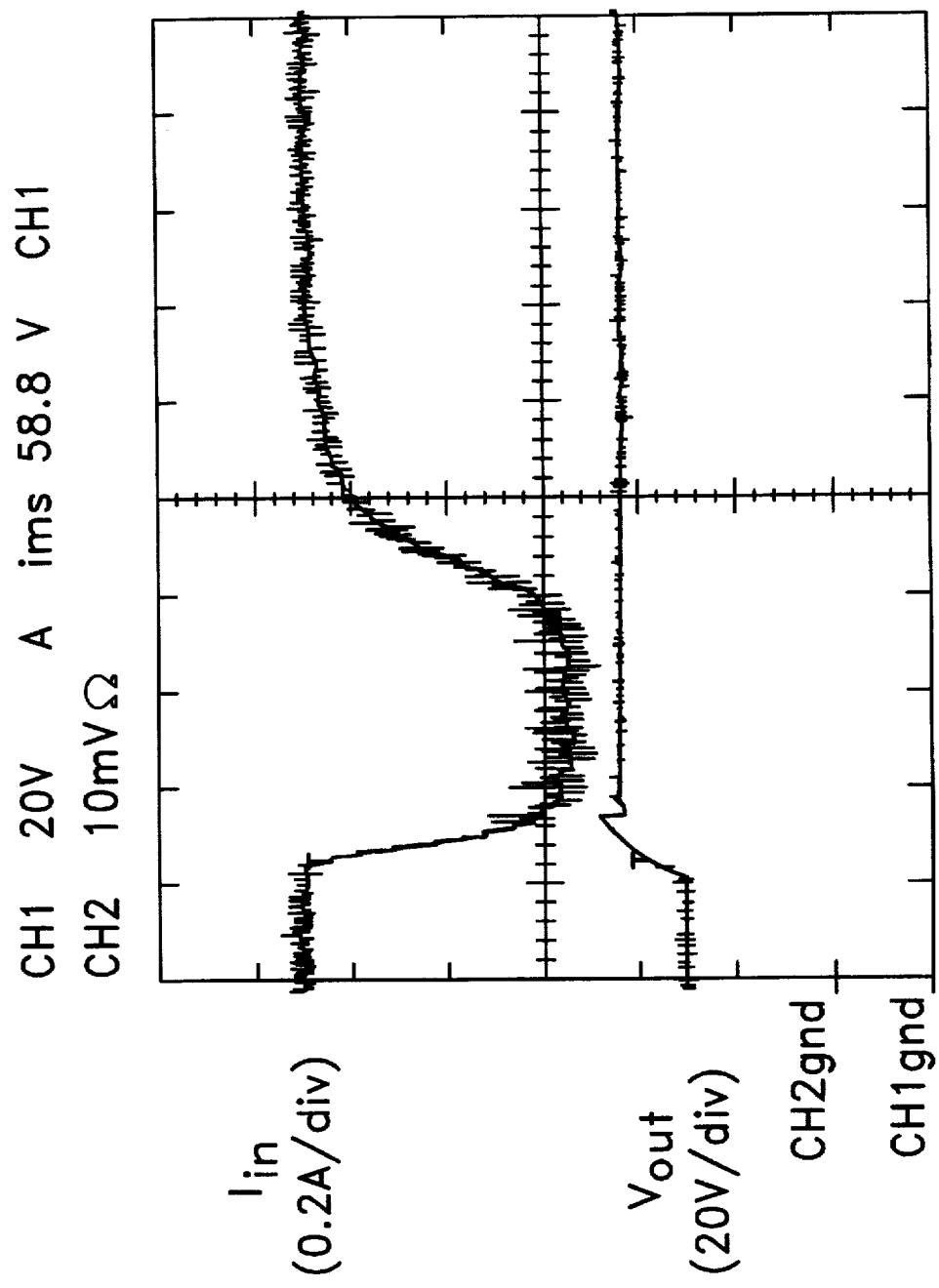
FIGS. 12a–b illustrate the transient response of the circuit of FIG. 9 for step changes in the output voltage.
Figure 12B:
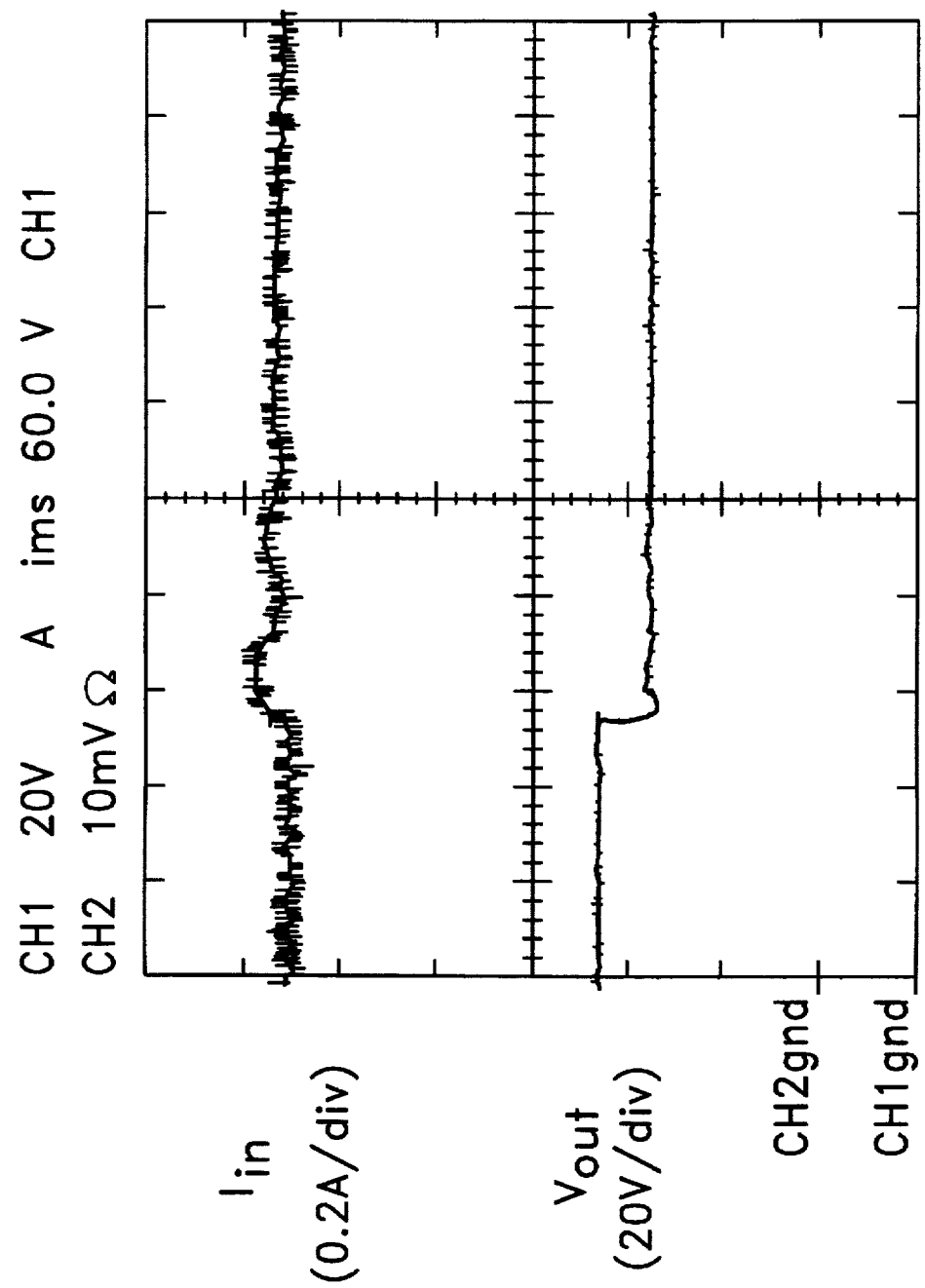

Depending upon the application, transients in the load may be numerous or limited. For terrestrial mobile applications such as solar-powered vehicle, the load transients can occur frequently. Examples include those due to rapid accelerations and hills, which would tend to raise the output voltage. FIG. 12 shows the circuit's response to variations in the load. FIG. 12a shows a 15% decrease in $V_{out}$. The response is a bit oscillatory, but the operating point recovers within 2 to 3 ms. Recovery is slower for the output voltage increase shown in FIG. 12b, most likely because of integrator tuning. In the figure, a 25% output voltage increase is tracked after 4–5 ms.

Protective Shutdown Operation

As described hereinabove, the preferred embodiment circuit of FIG. 9 includes a protective shutdown feature. The motivation for this feature is simple: protect the MPPT from damage due to an accidental open circuit at the output and protect the battery pack from damage due to overcharging. These two circumstances will result in an equivalent response from the protection subcircuit; therefore, only the open circuit is shown.

Figure 13:
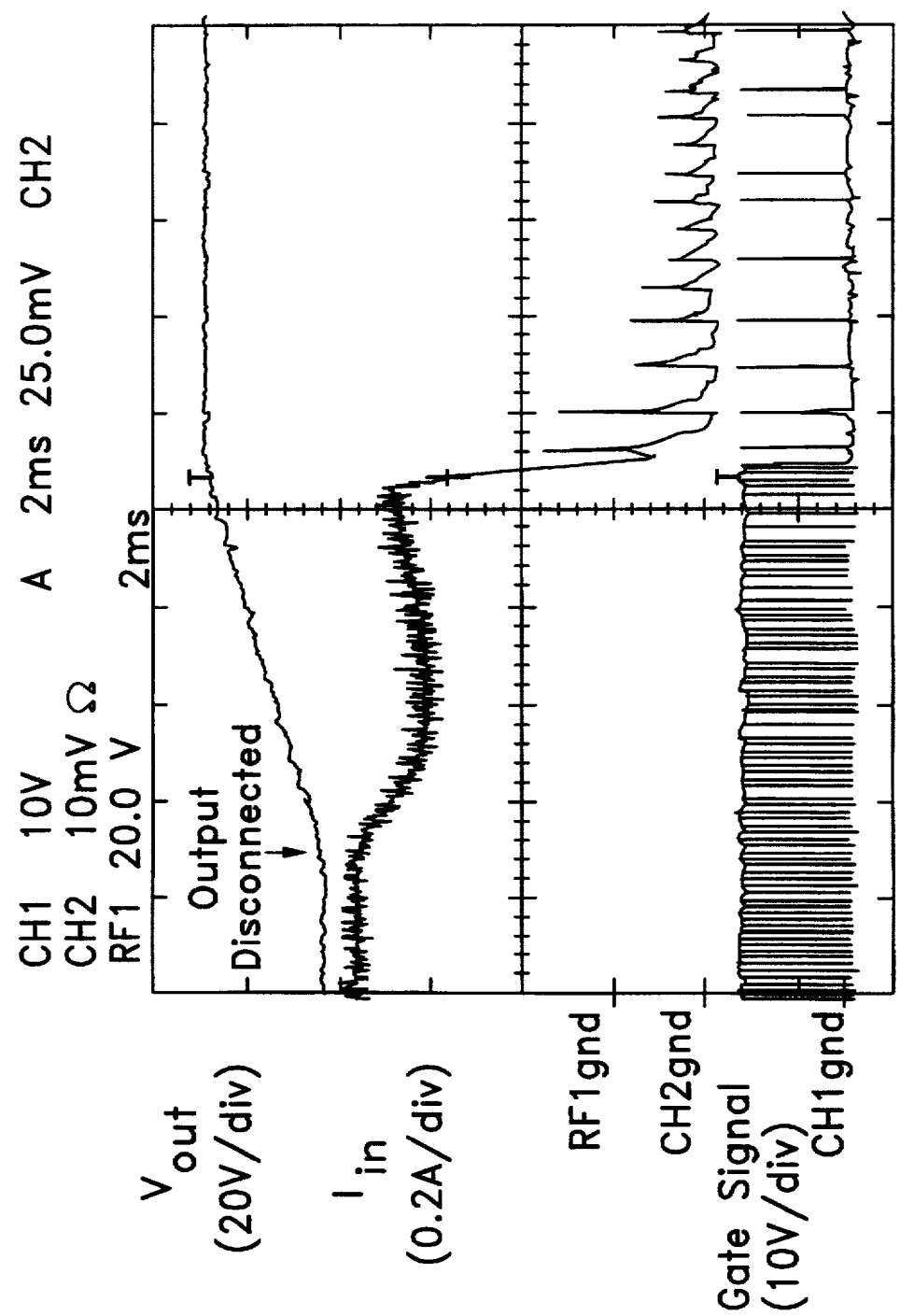
FIG. 13 is a graph illustrating the response of the circuit of FIG. 9 to an open-circuited output condition.

FIG. 13 depicts the output voltage, input current and the MOSFET 24 gate signal when the output is open circuited. The result can be analyzed as follows. When the output is first disconnected, the circuit functions as normal for approximately 10 ms while the output capacitor 32 charges to about 90 V. At this time the reverse voltage across the zener diode 40 exceeds its breakdown voltage, and some reverse current flows. This current will flow through the diode 40, which will forward bias the optoisolator 42 diode and pull the SHUTDOWN pin on the PWM chip 64 low. In steady state enough current will flow in this circuit to maintain the reverse bias on the zener diode until the offending condition is alleviated, which is the reason why the gate signal continues at a much lower frequency. Note that the average value of the input current drops to a very small value, enough to provide reverse current for the zener diode 40.

Alternative Embodiment Power Converter Controller

Figure 15:
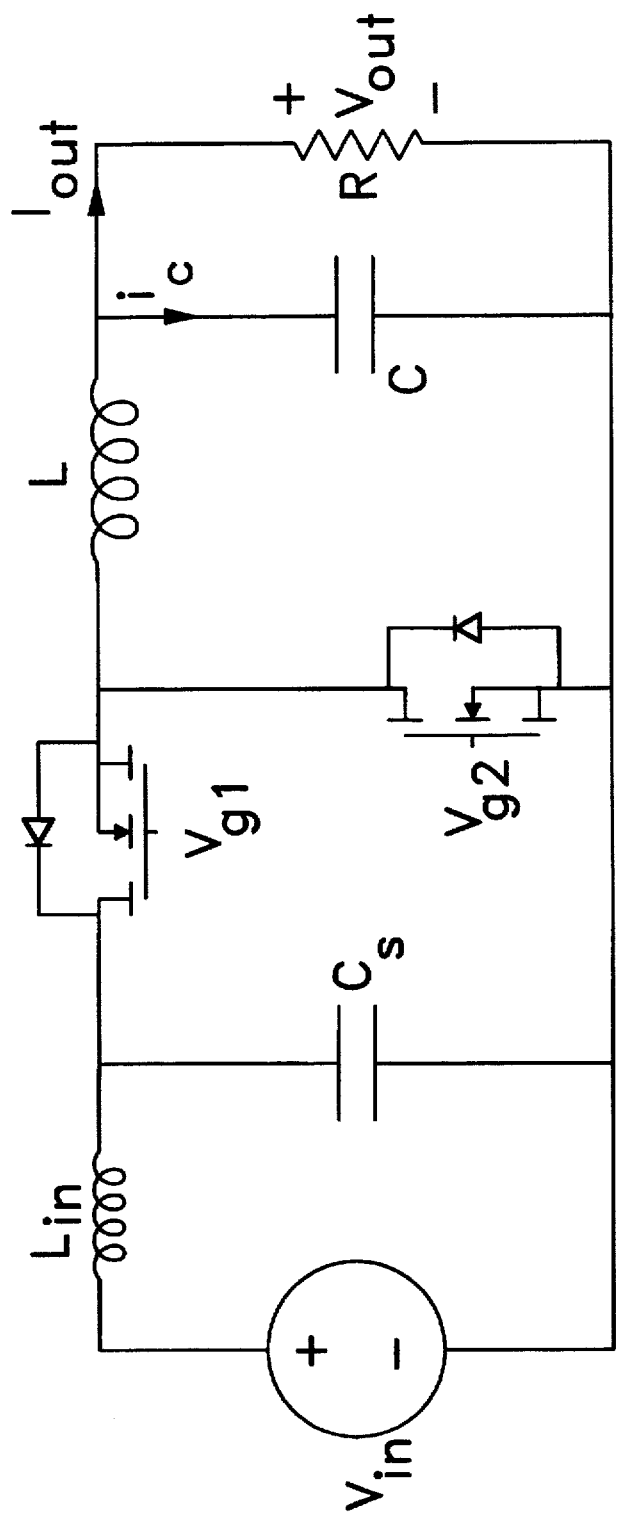
FIG. 15 is an electrical schematic diagram of a second embodiment power conversion circuit.

A few types of power converters have switches that operate in complement, such as the circuit shown in FIG. 15. In these applications, it is very important to prevent any overlap in switch action (overlap would produce short circuits). The usual solution is to add dead time—an intentional time gap between the two switch commands. This works well, but sacrifices efficiency, and can reduce system performance.

Figure 16:
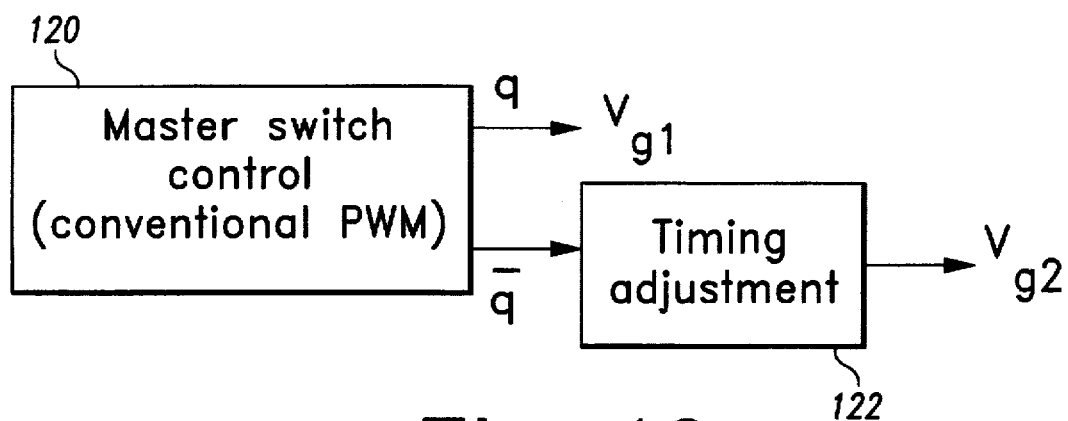
FIG. 16 is a schematic block diagram of a control circuit according to the present invention for the power converter of FIG. 15.
Figure 17:
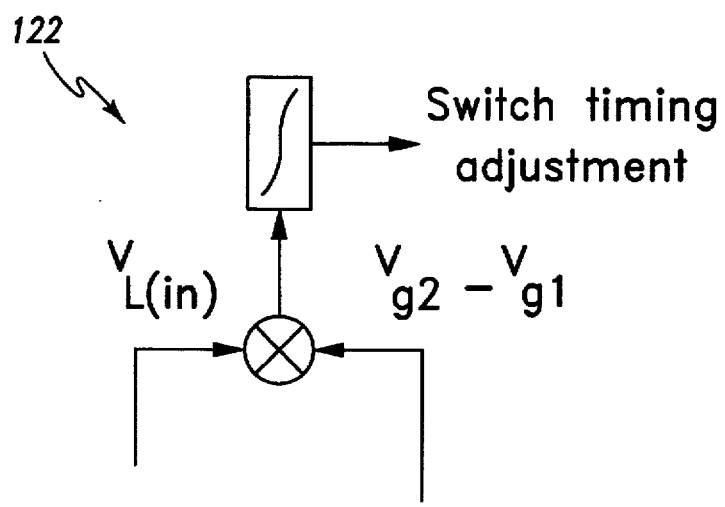
FIG. 17 is a schematic block diagram of the control parameters utilized in the control circuitry of FIG. 16.

The power minimizer control of the present invention can be used to actively control the dead time for minimum power. The control circuit of FIG. 16 is used to provide the gate control signals for the switches in the circuit of FIG. 15. The master switch control 120 utilizes a conventional PWM chip to generate complementary gate control signals. The timing adjustment 122 inserted into the $V_{g2}$ signal line is controlled according to the concepts of the present invention, as illustrated schematically in FIG. 17. The circuit 122 monitors the difference between the switch gate command signals, and correlates this with a representation of the input current. A simple integration control loop provides a signal to drive the dead time. The loop changes dead time until the input current is a minimum. Since the input voltage is fixed, this will minimize the power consumption.

Major applications for such a control circuit include: inverters (for motor drives, backup power, etc.), "synchronous converters" used for low-voltage dc-dc conversion, and resonant converters, in which timing is adjusted to minimize power loss because of switching.

Further Application of the Invention

Although the invention has been described hereinabove in a preferred embodiment in which it is used to control a power converter in a solar array application, the control scheme of the present invention has much broader application. In any steady-state optimization problem, the output being optimized could be a nonmonotonic function of the controlled variable. Often the output is dependent on the temperature, the load impedance, and other unknown and variable quantities. Thus, it is very useful to have an automatic tuning scheme that will take the system to the desired operating point using only input and output information. The present invention is a generalized tuning scheme that uses the correlation between changes in the input and corresponding changes in the output to tune the operating point. In general terms, the present invention utilizes a correlation function between the controlled variable and a perturbed waveform. When the system reaches the desired operating point, the correlation goes to zero and the system converges. This corresponds to the point at which the derivative of the output with respect to the input is zero. This tuning scheme is appropriate for any tuning problem which has a single maximum or minimum. A variety of tuning problems in power electronics and other areas fall into this category. A tuning scheme based on correlation usually requires an excitation input. The switching action in the controlled circuit perturbs all the states and provides this excitation. Thus, this tuning scheme is appropriate for switching power applications.

Figure 18:
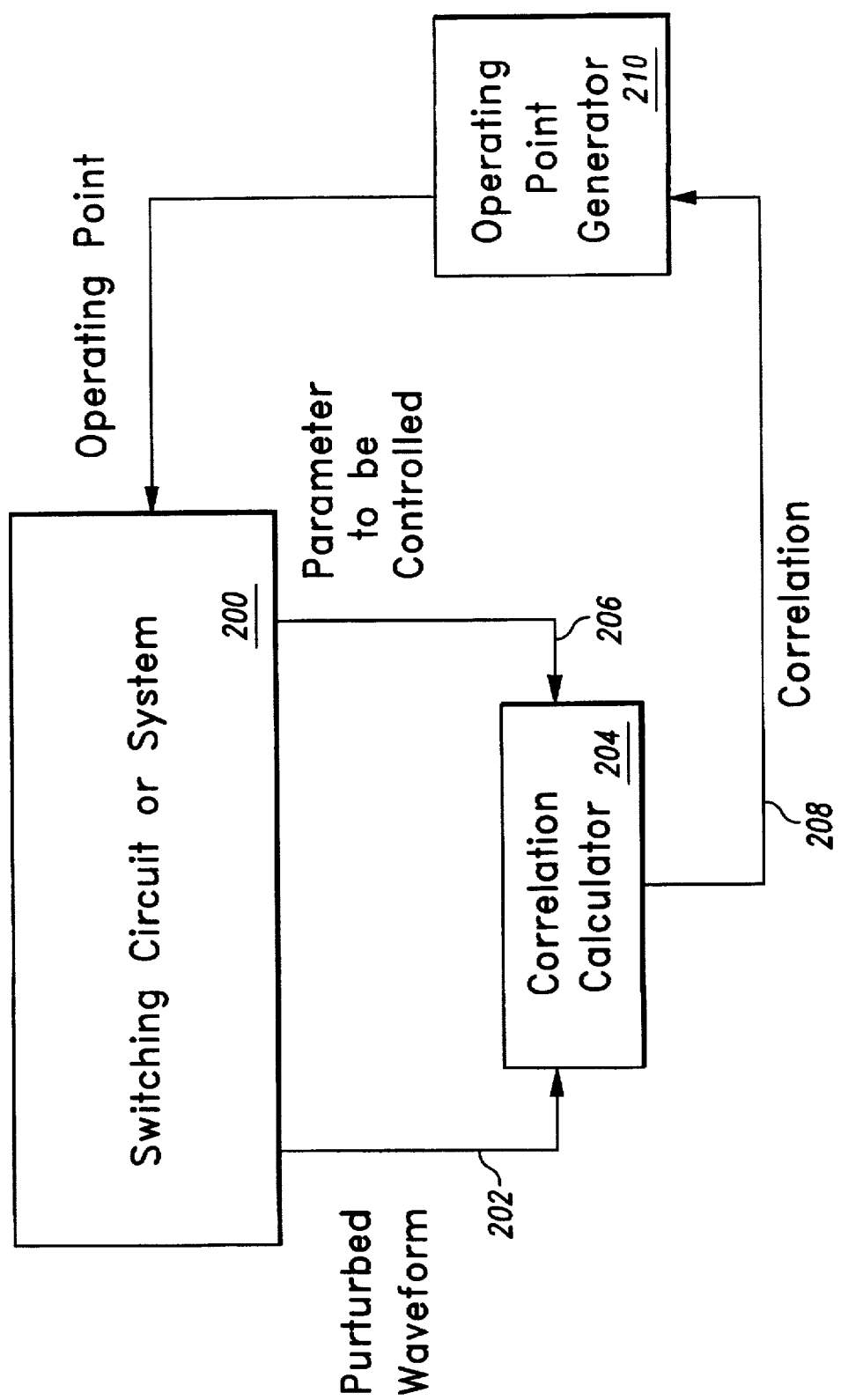
FIG. 18 is a schematic block diagram of a generalized tuning process of the present invention.

A generalized schematic block diagram of the present invention is illustrated in FIG. 18. A switching circuit or system 200 is shown which produces a perturbed waveform 202 as a byproduct of normal operation of the circuit 200 (i.e. the perturbation is not imposed for the purpose of controlling the circuit 200). This perturbed waveform 202 is used as a first input to a correlation calculator 204. A second input to the correlation calculator 204 is the parameter 206 which is to be controlled in the circuit 200. The correlation calculator 204 computes the correlation 208 between the perturbed waveform 202 and the parameter 206. The correlation 208 is provided to an operating point generator 210 which adjusts the operating point 212 of the circuit 200 until the correlation is minimized.

Another example of a specific application of the present invention is electronic drives for motor control which are a fast-growing industrial application. Motors and the controllers that operate them face a wide and unpredictable range of operating conditions. Motors are designed for the widest possible set of applications. This brings a tradeoff: as the load changes on a motor, its efficiency changes. Unless it operates continuously at rated conditions, the efficiency will be less than the highest possible value. In motor drives, both speed and magnetic field strength can be controlled separately today. The application usually has speed requirements, and it is known that the magnetic field can be adjusted to improve efficiency. However, no active methods for automatic adjustment of magnetic field have been discussed in the prior art. The present invention is the first power tracking control fast enough to be useful in a motor drive application. The control can adjust magnetic field dynamically during the switching process to improve efficiency under all conditions. Current knowledge, represented by P. Famouri and J. Cathey, "Loss minimization control of an induction motor drive," *IEEE Trans. Industry Applications*, vol. 27, January 1991, pp. 32–37, must use a perturbation approach to alter the operation of a motor. This prior art method is essentially a steady-state adjustment of motor operation to minimize power. Expensive components, such as 12-bit A/D and D/A converter, are necessary to implement this prior art approach. The prior art method must be tuned separately for various motor shaft power levels.

Figure 14:
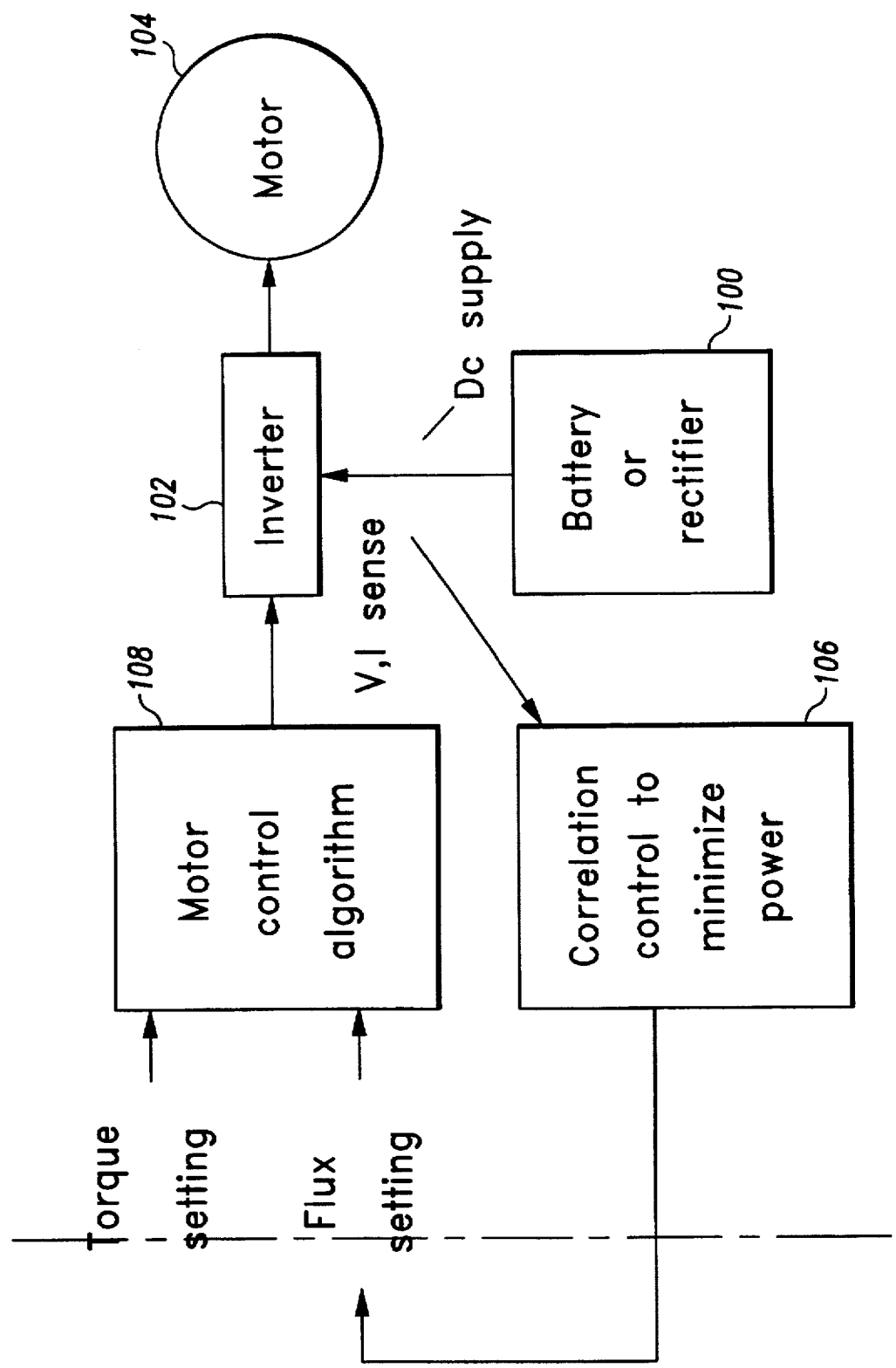
FIG. 14 is a schematic block diagram of an ac motor control circuit incorporating the power minimization control circuitry of the present invention.

The present invention, on the other hand, avoids all these problems by using a simple analog control block to actively minimize power flow during each cycle of motor operation. The power minimizer concept of the present invention is very well suited for this application. As shown in FIG. 14, almost all practical motor drives either rectify an ac input source to provide dc power or use direct dc power from a battery 100 or other source. This dc power supplies an inverter 102 or similar power electronic circuit that drives the motor 104. A correlation between power and voltage can be measured at the dc power point in a motor drive. The correlation is then used to adjust the magnetic flux command (at 106) within the motor drive 108 (in prior art applications, the flux command is held fixed, and is not used further). The flux will be driven to the value that minimizes the motor's power consumption. It is expected that a complete implementation of the present invention for a motor will be able to minimize input power on time frames of 0.1 s or less, regardless of loading conditions. The present invention is simple enough to be implemented for home appliances, industrial equipment, or any other circumstance in which maximum efficiency is desired in a switching motor controller.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for controlling a variable of a switching electrical circuit, comprising the steps of:
   (a) sensing a waveform in the circuit that is perturbed by a switching operation of the circuit;
   (b) sensing the variable to be controlled;
   (c) computing a correlation between the perturbed waveform and the variable to be controlled; and
   (d) changing an operating point of the circuit until the correlation is minimized.

2. The method of claim 1, wherein the electrical circuit comprises a switching dc-dc converter.

3. The method of claim 2, wherein the perturbed waveform is an input voltage of the converter.

4. The method of claim 2, wherein the variable to be controlled is a power input to the converter.

5. The method of claim 2, wherein the operating point comprises an input voltage and an input current of the converter.

6. The method of claim 5, wherein the operating point is changed by varying a duty ratio of the converter.

7. The method of claim 1, wherein the electrical circuit comprises an ac motor controller.

8. The method of claim 7, wherein the perturbed waveform is an input voltage of the ac motor.

9. The method of claim 7, wherein the variable to be controlled is a power input to the ac motor.

10. The method of claim 7, wherein the operating point is changed by varying a magnetic flux of the ac motor.

11. A controller for controlling a switching electrical circuit, comprising:
    first means for sensing a perturbed waveform of the electrical circuit, wherein the perturbed waveform is perturbed by a switching operation of the electrical circuit;
    second means for sensing a variable to be controlled of the electrical circuit;
    a correlation calculator coupled to the first and second means and operable to compute a correlation output comprising a correlation between the perturbed waveform and the variable to be controlled; and
    an operating point generator coupled to the correlation output and to the electrical circuit and operable to change an operating point of the electrical circuit based upon the correlation output.

12. The controller of claim 11, wherein the electrical circuit comprises a switching dc-dc converter.

13. The controller of claim 12, wherein the perturbed waveform is an input voltage of the converter.

14. The controller of claim 12, wherein the variable to be controlled is a power input to the converter.

15. The controller of claim 12, wherein the operating point comprises an input voltage and an input current of the converter.

16. The controller of claim 15, wherein the operating point generator is operable to vary a duty ratio of the converter.

17. The controller of claim 11, wherein the electrical circuit comprises an ac motor controller.

18. The controller of claim 17, wherein the perturbed waveform is an input voltage of the ac motor.

19. The controller of claim 17, wherein the variable to be controlled is a power input to the ac motor.

20. The controller of claim 17, wherein the operating point is changed by varying a magnetic flux of the ac motor.

21. A method for controlling an input power to a switching dc-dc converter, comprising the steps of:
    (a) sensing a ripple on an input voltage to the converter, wherein the ripple is produced by a switching operation of the converter;
    (b) sensing the input power to the converter;
    (c) computing a correlation between the ripple and the input power; and
    (d) varying a duty ratio of the switching operation until the correlation is minimized.

22. A controller for controlling an input power to a switching dc-dc converter, comprising:
    first means for sensing a ripple on an input voltage to the converter, wherein the ripple is produced by a switching operation of the converter;
    second means for sensing the input power to the converter;

a correlation calculator coupled to the first and second means and operable to compute a correlation output comprising a correlation between the ripple and the input power; and a switching driver coupled to the correlation calculator and to the converter and operable to vary a duty ratio of the switching operation based upon the correlation output.

23. A method for controlling an input power to an ac motor, comprising the steps of:

(a) sensing a ripple on an input voltage to the ac motor, wherein the ripple is produced by a switching operation of a driver of the ac motor;

(b) sensing the input power to the ac motor;

(c) computing a correlation between the ripple and the input power; and (d) varying a magnetic flux of the ac motor until the correlation is minimized.

24. A controller for controlling an input power to an ac motor, comprising:

first means for sensing a ripple on an input voltage to the ac motor, wherein the ripple is produced by a switching operation of a driver of the ac motor;

second means for sensing the input power to the ac motor;

a correlation calculator coupled to the fist and second means and operable to compute a correlation output comprising a correlation between the ripple and the input power; and a motor driver coupled to the correlation calculator and to the ac motor and operable to vary the magnetic flux of the ac motor based upon the correlation output.

* * * * *

UNITED STATES PATENT AND TRADEMARK OFFICE
CERTIFICATE OF CORRECTION

PATENT NO : 5,801,519
DATED     : September 1, 1998
INVENTOR(S): Midya, et al.

It is certified that error appears in the above-identified patent and that said Letters Patent is hereby corrected as shown below:

In column 8, line 3, please add a superscript --$^2$-- following the formula "$(v_s')$" (first occurrence).
In column 8, line 25, please change "$P_{opr}$" to --$p_{opt}$--.
In column 8, line 47, please change "$J(t) \leqq 0$" to --$J(t) \geqq 0$--.

Signed and Sealed this

Seventh Day of December, 1999

Attest:

Q. TODD DICKINSON

*Attesting Officer*     Acting Commissioner of Patents and Trademarks